(12) United States Patent
Hu et al.

(10) Patent No.: US 7,082,455 B2
(45) Date of Patent: Jul. 25, 2006

(54) METHOD AND APPARATUS OF PARAMETER PASSING OF STRUCTURED DATA FOR STORED PROCEDURES IN A CONTENT MANAGEMENT SYSTEM

(75) Inventors: Tawei Hu, San Jose, CA (US); James J. Lin, Cupertino, CA (US); Kenneth C. Nelson, Hollister, CA (US); Alan T. Yaung, San Jose, CA (US); Randy Richardt, San Jose, CA (US); Lily L. Liang, San Jose, CA (US); Ed Gallagher, San Jose, CA (US); Dwayne L. Richardson, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 10/128,260

(22) Filed: Apr. 23, 2002

(65) Prior Publication Data
US 2003/0200256 A1 Oct. 23, 2003

(51) Int. Cl.
*G06F 15/16* (2006.01)
*G06F 13/00* (2006.01)
(52) U.S. Cl. ...................... 709/203; 709/219
(58) Field of Classification Search ............... 709/203, 709/217, 219; 719/330; 713/330
See application file for complete search history.

(56) References Cited

U.S. PATENT DOCUMENTS

| | | | |
|---|---|---|---|
| 4,751,740 A | 6/1988 | Wright | |
| 4,969,091 A | 11/1990 | Muller | |
| 5,615,337 A | 3/1997 | Zimowski et al. | |
| 5,632,015 A | * 5/1997 | Zimowski et al. | 707/3 |
| 5,644,768 A | 7/1997 | Periwal et al. | |
| 5,742,810 A | 4/1998 | Ng et al. | |
| 5,774,719 A | 6/1998 | Bowen | |
| 5,778,398 A | 7/1998 | Nagashima et al. | |
| 5,799,310 A | 8/1998 | Anderson et al. | |
| 5,819,252 A | 10/1998 | Benson et al. | |
| 5,862,378 A | 1/1999 | Wang et al. | |

(Continued)

FOREIGN PATENT DOCUMENTS

WO    WO 99/22362    5/1999

OTHER PUBLICATIONS

Jeonghee Kim, Taissok Han, and Suk Kyoon Lee, "Visualization of Path Expressions in a Visual Object-Oriented Database Query Language," (2 pages).

(Continued)

*Primary Examiner*—Rupal Dharia
*Assistant Examiner*—Brian J. Gillis
(74) *Attorney, Agent, or Firm*—Sawyer Law Group LLP

(57) ABSTRACT

A content management system is provided including a server computer and a client computer. The server includes a data repository and a stored procedure. The disclosed methodology provides a way of handling parameter passing of structured data for stored procedures in the system. The system is capable of both encoding data into a structured data format and decoding data from the structured data format. The structured data format employs a binary large object (BLOB) and character large object (CLOB) to achieve handling of fixed length binary data and variable length character data. Advantageously, the stored procedure interface need not be rewritten and customized for each stored procedure in the server.

26 Claims, 5 Drawing Sheets

U.S. PATENT DOCUMENTS

| | | | |
|---|---|---|---|
| 5,875,332 | A | 2/1999 | Wang et al. |
| 5,892,902 | A | 4/1999 | Clark |
| 5,940,616 | A | 8/1999 | Wang |
| 6,012,067 | A | 1/2000 | Sarkar |
| 6,016,394 | A | 1/2000 | Walker |
| 6,047,291 | A | 4/2000 | Anderson et al. |
| 6,055,637 | A | 4/2000 | Hudson et al. |
| 6,063,133 | A | 5/2000 | Li et al. |
| 6,065,117 | A | 5/2000 | White |
| 6,067,414 | A | 5/2000 | Wang et al. |
| 6,073,168 | A * | 6/2000 | Mighdoll et al. ........... 709/217 |
| 6,088,524 | A | 7/2000 | Levy et al. |
| 6,104,393 | A | 8/2000 | Santos-Gomez |
| 6,128,621 | A | 10/2000 | Weisz |
| 6,148,342 | A | 11/2000 | Ho |
| 6,161,182 | A | 12/2000 | Nadooshan |
| 6,167,405 | A | 12/2000 | Rosensteel, Jr. et al. |
| 6,173,400 | B1 | 1/2001 | Perlman et al. |
| 6,219,826 | B1 | 4/2001 | De Pauw et al. |
| 6,233,586 | B1 | 5/2001 | Chang et al. |
| 6,249,822 | B1 * | 6/2001 | Kays, Jr. et al. ............ 719/330 |
| 6,263,313 | B1 | 7/2001 | Milsted et al. |
| 6,263,342 | B1 | 7/2001 | Chang et al. |
| 6,272,488 | B1 | 8/2001 | Chang et al. |
| 6,279,111 | B1 | 8/2001 | Jensenworth et al. |
| 6,282,649 | B1 | 8/2001 | Lambert et al. |
| 6,289,344 | B1 | 9/2001 | Braia et al. |
| 6,289,458 | B1 | 9/2001 | Garg et al. |
| 6,292,936 | B1 | 9/2001 | Wang |
| 6,308,274 | B1 | 10/2001 | Swift |
| 6,314,449 | B1 | 11/2001 | Gallagher et al. |
| 6,327,629 | B1 | 12/2001 | Wang et al. |
| 6,338,056 | B1 | 1/2002 | Dessloch et al. |
| 6,339,777 | B1 | 1/2002 | Attaluri et al. |
| 6,343,286 | B1 | 1/2002 | Lee et al. |
| 6,751,798 | B1 * | 6/2004 | Schofield .................... 719/330 |
| 6,751,799 | B1 * | 6/2004 | Kays et al. ................. 719/330 |
| 6,845,392 | B1 * | 1/2005 | Koontz et al. .............. 709/219 |
| 2001/0002486 | A1 | 5/2001 | Kocher et al. |
| 2001/0008015 | A1 | 7/2001 | Vu et al. |
| 2001/0019614 | A1 | 9/2001 | Madoukh |
| 2003/0200256 | A1 * | 10/2003 | Hu et al. .................... 709/203 |

OTHER PUBLICATIONS

Chien-I Lee, Ye-In Chang, and Wei-Pang Yang, "Design Of A New Indexing Organization For A Class-Aggregation Hierarchy In Object-Oriented Databases", Journal of Information Science and Engineering 15, 1999, pp. 217-241, Taiwan.

Jörn W. Janneck and Martin Naedele, "Modeling Hierarchical and Recursive Structures Using Parametric Petri Nets." Computer Engineering and Networks Laboratory, Swiss Federal Institute of Technology Zurich, pp. 445-452.

Akira Kawaguchi, Daniel Lieuwen, Inderpal Mumick, Kenneth Ross, "Implementing Incremental View Maintenance in Nested Data Models" Database Programming Languages, 6th International Workshop, DBPL-6, Aug. 18-20, 1997 Proceedings, pp. 203-221.

Li Tian-Zhu, "Normalization of Nested Structure for Complex Objects" in Chinese, Journal of Software, vol. 9, No. 5, p. 390-396, May 1998, (with English Abstract).

* cited by examiner

BINARY DATA ONLY

METHOD AND APPARATUS OF PARAMETER PASSING OF STRUCTURED DATA FOR STORED PROCEDURES IN A CONTENT MANAGEMENT SYSTEM

BACKGROUND

The disclosures herein relate generally to content management systems and more particularly to addressing problems associated with the lack of handling of structured data by stored procedures.

Modem computer database environments such as shown in FIG. 1 often include a client computer system connected to a server computer system containing one or more data repositories (such as relational database management systems—RDBMS). One or more stored procedures are stored in the server computer system. Each stored procedure, when executed, interacts with and performs database operations (such as a database query) on one or more of the database repositories.

Stored procedures in a content management system typically only handle primitive data types such as integer, long, binary large object (BLOB) and character large object (CLOB) in the parameter passing carried out by the procedure's interface (API). The interface of the conventional stored procedure does not provide parameter passing of structured data with variable length data such as 1) an array of integers; 2) an array of character strings, or 3) an array of mixed data types.

Some content management software is based on a set of stored procedures that interact with database servers, such as DB2 servers, for example. These stored procedures do not pass structured data and this can present a problem in many applications.

What is needed is a mechanism and methodology for handling parameter passing of structured data for stored procedures in a client-server content management system.

SUMMARY

Accordingly, a method of communicating data between a stored procedure in a server and a client is disclosed which includes calling, by the stored procedure, a utility interface program in the server. The utility interface program encodes the data in a structured data format including a plurality of elements. The encoded data is transmitted by the server in the structured data format to the client. The client receives the encoded data and calls the utility interface program in the server to decode the encoded data. In one embodiment of the disclosed methodology, the structured data format includes a binary large object (BLOB) and a character large object (CLOB) to enable handling of both binary data and variable length character strings.

A principal advantage of the embodiment disclosed herein is the ability to handle parameter passing of structured data between a stored procedure and a client system.

DETAILED DESCRIPTION

Figure 1:
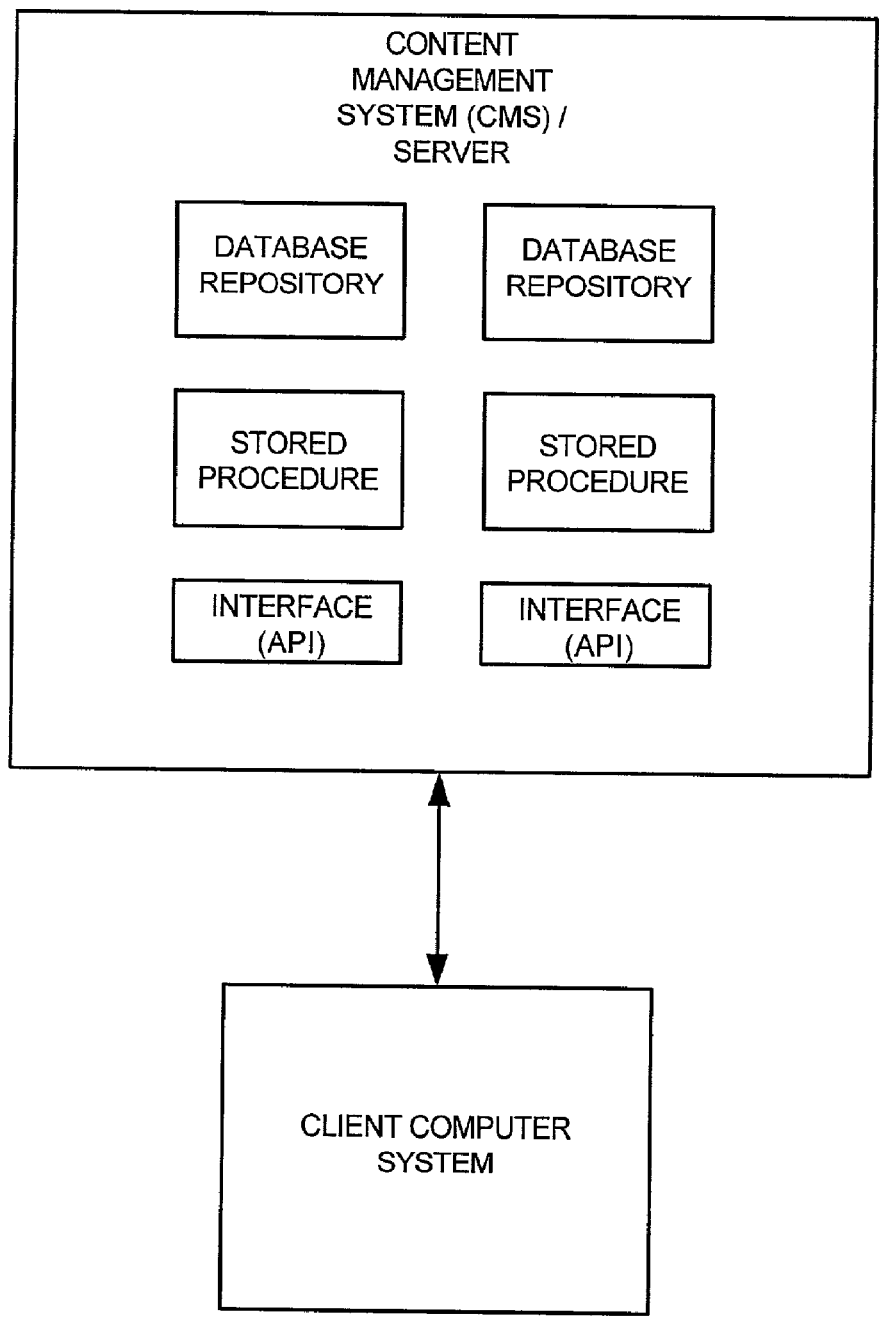
FIG. 1 is a block diagram of a conventional content management system.
Figure 2:
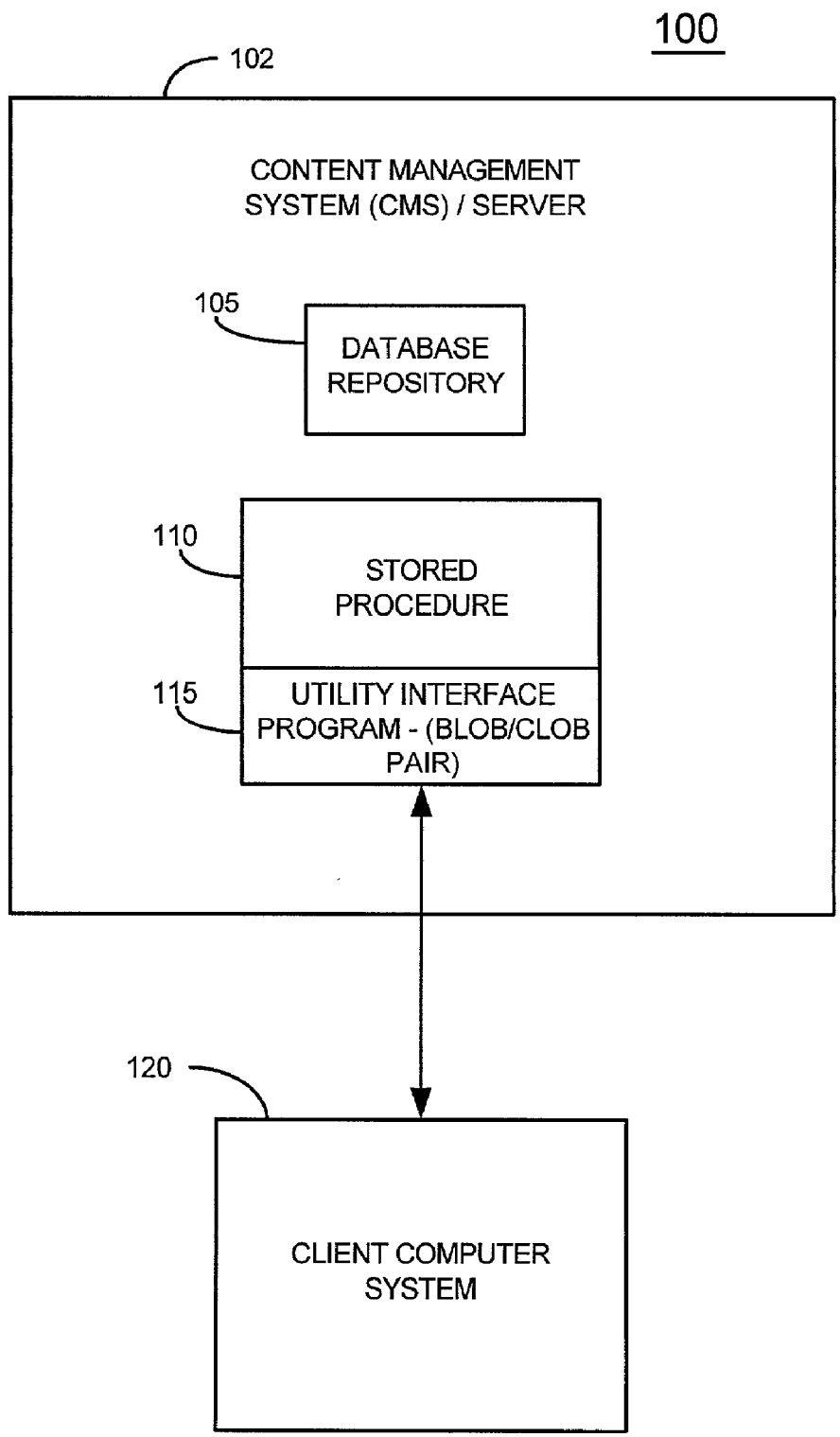
FIG. 2 is a block diagram of the disclosed content management system which features the ability to handle parameter passing of structured data.

FIG. 2 depicts the disclosed content management system 100 in block diagram form. Content management system 100 is typically implemented in a server computer 102 which includes a database repository 105. One type of database which may be used in database repository 105 is a relational database system (RDBS) although other types of database structures may be employed as well. In actual practice, multiple database repositories 105 may be employed in content management system 100.

The disclosed methodology for handling parameter passing of structured data for store procedures in a content management system is now discussed. Content management system 100 includes at least one stored procedure 110 which is connected via its interface 115 to a client computer 120. The disclosed method involves communication of data between stored procedure 110 and client 120. An orthogonal data format provides a foundation for handling structured data communication including binary data, character data and mixed (binary and character) data.

The method includes an encoding process and a decoding process. The encoding process builds a data format for input parameters with structured data of stored procedure 110. In other words, a data format for parameter passing is constructed. The decoding process parses the data format for output parameters with structured data of stored procedure 110.

Stored procedures are often used to provide queries to a database repository. However, in the disclosed methodology, stored procedures can perform different functions. More particularly, when server 100 desires to transmit data to client 120, an encode/decode utility located in stored procedure 110 or its interface 115 is called. The utility acts as an encoder to encode the data in a BLOB/CLOB pair (binary large object/character large object pair) which is transmitted via interface 115 to client 120. In actual practice, the utility interface program may be located in interface 115 where it can be called by either stored procedure 110 or client 120. When client 120 receives the BLOB/CLOB pair, client 120 calls the utility interface program associated with the stored procedure, and the utility decodes the BLOB/CLOB pair to restore the original data for use by client 120.

Conversely, when client 120 desires to transmit data to stored procedure 110 of server 100, client 120 calls the utility interface program which encodes the data into the BLOB/CLOB pair which is then sent along to the stored procedure. The stored procedure can then decode the data as before. From the above, it will be appreciated that the utility can perform a bidirectional encode/decode operation depending on the circumstances. Either the stored procedure or the client can call the utility for encoding and decoding operations. Advantageously, the BLOB/CLOB pair data format employed by the utility enables communication of many kinds of data including structured data with variable length data such as integer arrays, character string arrays, binary data, character data and arrays of mixed data types (binary and character data).

Each piece of data which is to be built (encoded) or parsed (decoded) is placed in a BLOB/CLOB as an element. An element is composed of an element ID, a data type, a length and a value. The element ID identifies the element. For example, the element ID may be a component ID, a customer number or an account number. The data type describes the particular type of data, for example, binary, character or mixed. The length denotes the length of the data value to be passed between the stored procedure and client or vice versa. For integer types of data the length is fixed; however, for character data the length depends on the length of the particular string to be passed. The value represents the actual value to be passed.

Each part of the element is stored in the BLOB or CLOB. Element ID, the data type and the length are stored as a header in the BLOB. It is acceptable to store the value in either the BLOB or CLOB depending on the data type. In other words, the BLOB is used to store header data and binary data, whereas the CLOB is used to store character data. In the particular embodiment shown in the drawings subsequently discussed, a header contains an element ID (a 2 byte integer), a data type (a 2 byte integer) and a length (a 4 byte integer).

Figure 3:
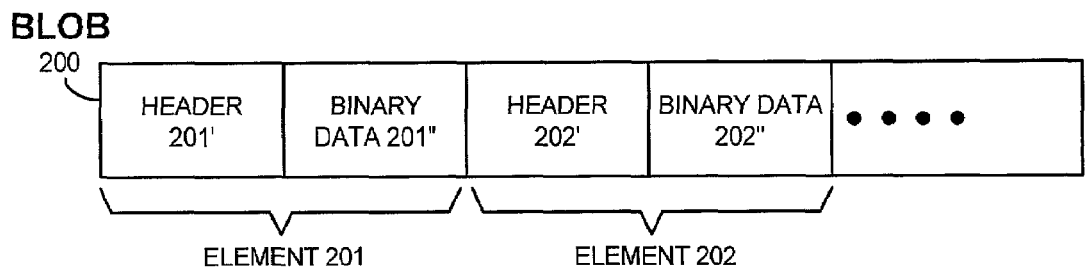
FIG. 3 is a representation of the binary structured data format employed in one operational embodiment of the disclosed content management system and methodology.
Figure 3:
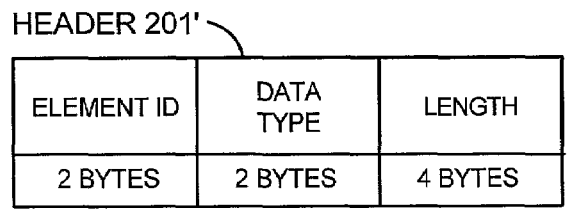
Figure 3:
Figure 4:
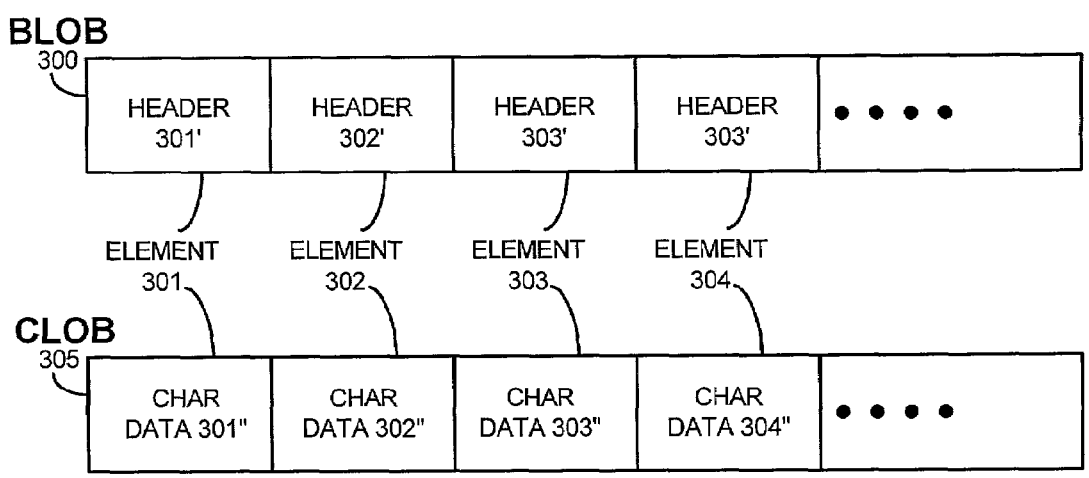
FIG. 4 is a representation of the character structured data format employed in another operational embodiment of the disclosed content management system and methodology.
Figure 5:
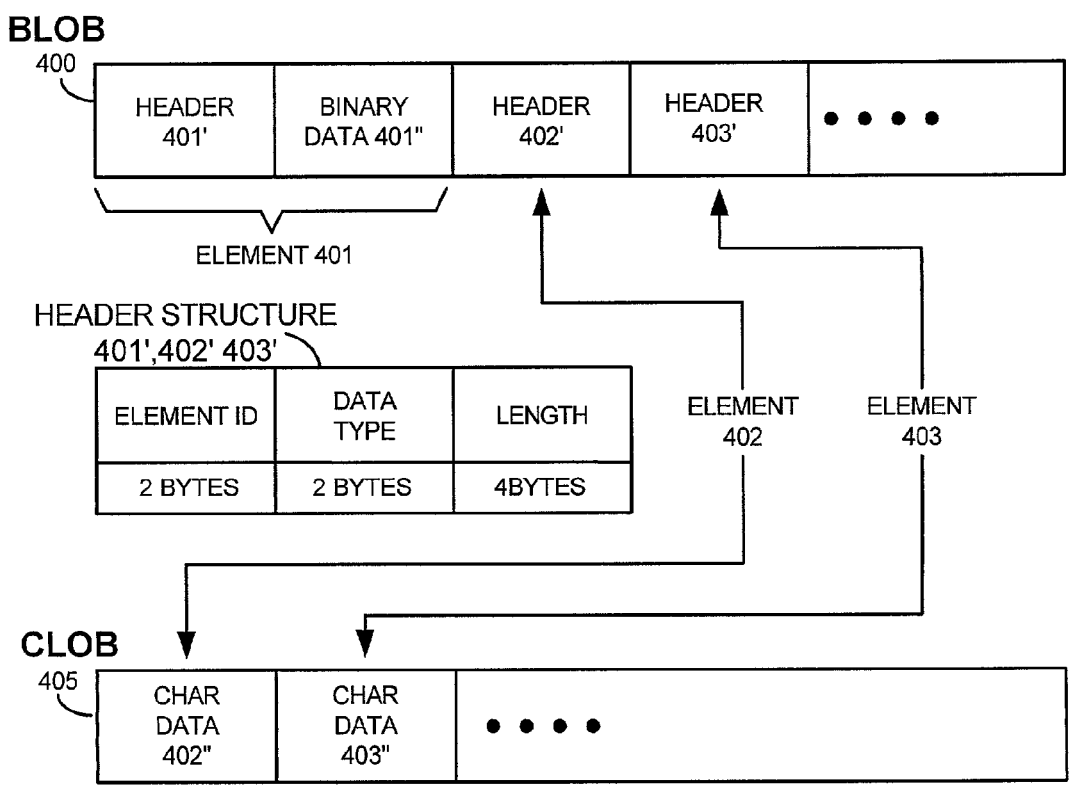
FIG. 5 is a representation of the mixed binary and character structured data format employed in yet another embodiment of the disclosed content management system and methodology.

Three operational scenarios are now discussed with reference to FIGS. 3, 4 and 5 respectively. More particularly, FIG. 3 shows the data structure employed for binary only data structures. FIG. 4 illustrates the data structure for character data only data structures. FIG. 5 depicts the data structure for mixed binary and character data structures.

Returning to the binary data scenario data structure of FIG. 3, BLOB 200 includes elements 201 and 202. Element 201 includes header 201' and binary data 201", while element 202 includes header 202' and binary data 202". Header 201' includes a 2 byte ELEMENT ID field for element 201, a 2 byte DATA TYPE field to indicate the data type of the binary data of element 201 as well as a LENGTH field to indicate the length of the binary data (4 bytes in this example). Element 202 is stored in BLOB 200 in a similar fashion to element 201 as shown. CLOB 205 is a null string in this example.

FIG. 4 depicts the data structure employed in a character data scenario. Element 301 includes a header 301' and a character data field 301" which includes the actual character data. Header 301' includes an ELEMENT ID field, a DATA TYPE field and a LENGTH field for element 301 as shown. Similar headers (302', 303' and 304') are provided for elements 302, 303 and 304, respectively. Header 301' of element 301 and the headers associated with the other elements 302, 303 and 304 are stored in BLOB 300 while character data (CHAR DATA 302", CHAR DATA 303" and CHAR DATA 304") are stored in CLOB 305.

FIG. 5 illustrates the data structure employed in the mixed binary and character data scenario. In this example, data element 401 includes header 401' in a HEADER field and binary data 401" in a BINARY DATA field. More specifically, header 401' includes an element ID for element 401 in an ELEMENT ID field. Header 401' also includes the type of the binary data in a DATA TYPE field and the length of the binary data in a LENGTH field as shown. It is noted that the BINARY DATA field 401' contains the actual value of the binary data for element 401. Both header 401' and the actual binary data 401" of element 401 are stored in BLOB 400.

The other type of mixed data for which the data structure of FIG. 5 provides is character data, such as the character elements 402 and 403 illustrated. By way of example, character element 402 includes both a header 402' in a HEADER field and the actual character data 402" in a CHAR DATA field. Header 402' includes an ELEMENT ID field for storing the element ID of element 402, a DATA TYPE field for storing the data type of element 402 and a LENGTH field for storing the length of element 402. The header 402' of element 402 is stored in BLOB 400 while the character data 402" is stored in the CLOB. The topology of character element 403 is analogous to the topology of character element 402 as shown in FIG. 5.

Returning now to FIG. 2, the stored procedure's utility interface program 115 provides two functions, namely a build function to take in specific types of data and pack the data into a BLOB portion and a CLOB portion. This build function is an encoding function. Interface 115 also provides a parse function to retrieve data from the BLOB and CLOB portions. This parse function is a decoding function. The encoding and decoding is performed by the aforementioned utility program associated with interface 115. Standard database mechanisms to pass parameters to stored procedures can be used to pass the BLOB and CLOB to and from stored procedure 110. Stored procedure 110 is capable of supporting variable length parameters by using the described BLOB CLOB pair data arrangement depicted in FIGS. 3–5.

In one embodiment, interface 115 supports the following data types: sqlint16, sqlint32, sqlint64, double, character and binary data types. These data types are supported as either NULLable or nonNULLable. When the utility program encodes or builds the BLOB and CLOB, the data type is specified. When parsing or decoding, the data type is also specified to the utility program. If the date type upon encode does not equal the data type upon decode, the utility program returns an error. An exception to this error rule is that a nonNULLable data type can be built into the BLOB and CLOB and can be parsed as a NULLable data type. This is valid because nonNULLable is a subset of NULLable.

One example of the above mentioned utility interface program 115 that can be used for the encoding and decoding functions is now described with reference to a C language implementation. The utility uses a structure to hold all of the information with respect to the BLOB and CLOB. The structure is declared and initialized using one of the initialization routines discussed below. In actual practice, there are two different types of initialization, namely one for encoding and one for decoding. The structure is passed to other routines in the utility and is used for manipulating the data in the BLOB and CLOB. One structure which is acceptable is:

```
typedef struct __ICMPARMLOB_STRUCT
{
    sqluint16   sByteOrder;
    sqluint32   lClobLength;
    sqluint32   lClobOffset;
    char      * pClob;
    sqluint32   lBlobLength;
    sqluint32   lBlobOffset;
    char      * pBlob;
} ICMPARMLOB_STRUCT;
```

The utility program includes a number of routines to initialize the structure. These routines are given below along with comments which describe the specific purpose of each routine: The acronym "SP" refers to stored procedure 110 and "API" refers to application program interface.

```
// . . . This routine is called by API or SP to create a CLOB/BLOB structure in which to
store data
sqlint32 ICMParmInitForBuild(ICMPARMLOB_STRUCT * pParms);
// . . . This routine is used by APIs which call SPs that return the CLOB and BLOB to
// make sure the output buffer is large enough to handle the data returned.
sqlint32 ICMParmInitForBuildWithSize(ICMPARMLOB_STRUCT * pParms,
            sqluint32      size);
// . . . This routine is used by APIs which call SPs that return the CLOB and BLOB to
// make sure the output buffer is large enough to handle the data returned.
// This function is used when nothing is put into the BLOB/CLOB when it is
// sent to the SP, but results are returned from the SP.
sqlint32 ICMParmInitForOutput(ICMPARMLOB_STRUCT * pParms,
            sqluint32      size);
// . . . Initialize CLOB/BLOB to pass a NULL CLOB/BLOB
sqlint32 ICMParmInitNULL(ICMPARMLOB_STRUCT * pParms);
// . . . Called from SP to initialize CLOB/BLOB structure
sqlint32 ICMParmInitForParse(ICMPARMLOB_STRUCT * pParms,
            char         * pClob,
            char         * pBlob);
// Called from API to initialize CLOB/BLOB structure returned from SP
sqlint32 ICMParmInitForParseAPI(ICMPARMLOB_STRUCT * pParms,
            char         * pClob,
            char         * pBlob);
```

The utility program includes additional functions which are used to handle freeing of memory and to prepare the BLOB and CLOB to be sent between stored procedure 110 and client 120. In actual practice, a memory freeing routine is only needed after the build or encoding because in the decoding or parsing, BLOB and CLOB data is used directly from a host variable used to pass the data. A "prepare to send" routine is called to set the data length properly in the BLOB before it is sent between client 120 and stored procedure 110. These routines are now presented below:

```
//..This "freeing of memory" routine frees memory allo-
   cated for CLOB/BLOB (only needed after building)
sqlint32                              ICMParmnFree
   (ICMPARMLOB_STRUCT*pparms);
//..This "prepare to send" routine sets the sizes for the
   CLOB and BLOB correctly, (must be called before
// the CLOB and BLOB are passed into or returned from
   a    SP)    sqlint32    ICMParmPrepareToSend
   (ICMPARMLOB_STRUCT*pParms);
```

The utility program associated with interface 115 also provides a set of constants for the data types supported. It is important that these constants remain consistent among the implementations of the interface. The list of constants is provided below for one embodiment of the disclosed methodology.

```
typedef enum {
    PARM_TYPE_CHAR = 1,
    PARM_TYPE_SHORT,
    PARM_TYPE_LONG,
    PARM_TYPE_BINARY,
```

-continued

```
    PARM_TYPE_DOUBLE,
    PARM_TYPE_BIGINT,
    PARM_TYPE_MAX
} PARM_TYPE;
typedef enum {
    PARM_TYPE_CHAR_NULLABLE = 501,
    PARM_TYPE_SHORT_NULLABLE,
    PARM_TYPE_LONG_NULLABLE,
    PARM_TYPE_BINARY_NULLABLE,
    PARM_TYPE_DOUBLE_NULLABLE,
    PARM_TYPE_BIGINT_NULLABLE,
    PARM_TYPE_MAX_NULLABLE
} PARM_TYPE_NULLABLE;
```

The utility program (here a C interface) provides one routine to build or encode the BLOB CLOB and two routines to parse or decode the BLOB CLOB. These routines take in variable parameter lists to advantageously allow many values to be handled in a single call. In one embodiment, each routine takes in the BLOB/CLOB structure, a structure containing log information and a repeating list of elements. As discussed earlier, each element includes an element ID, a data type, a length, and the actual data value which may be either binary or character data. More specifically, element ID's are declared in lspdef.h. The data type is one of the constants referenced above. The value can be a pointer to the actual data value. The data type varies according to whether binary, character or mixed data is being manipulated. In more detail:

```
//*********************************************************************
// lspdef.h    Element ID definition
//*********************************************************************
#define ID_ACCESS_DATA           10
#define ID_ACCESS_DLL_NAME       11
#define ID_ACCESS_MOD_NAME       12
#define ID_ACCESS_MOD_STATUS     13
```

-continued

```
#define ID_ACCESS_TOKEN_TYPE       14
#define ID_ACTION                  15
#define ID_ATTRIBUTE_ID            16
#define ID_ATTR_FLAGS              17
#define ID_ATTRIBUTE_LENGTH        18
#define ID_ATTRIBUTE_TYPE          19
#define ID_ATTRIBUTE_VALUE         20
#define ID_CCSID                   21
#define ID_CHECK_IN                22
#define ID_CHECK_OUT               23
#define ID_CHILD_ITEMID            24
#define ID_CHILD_LINK_TYPE         25
#define ID_COLLNAME                26
#define ID_COLL_CODE               27
#define ID_COLUMN_NAME             28
#define ID_COMMIT_COUNT            29
#define ID_COMPONENT_DEFAULT_TYPE  30
#define ID_COMPONENT_DEFAULT_VALUE 31
#define ID_COMPONENT_DELETE_RULE   32
#define ID_COMPONENT_ID            33
#define ID_COMPONENT_MINIMUM_VALUE 34
#define ID_COMPONENT_MAXIMUM_VALUE 35
#define ID_COMPOSITE_ATTR_ID       36
#define ID_COMPTYPE_ID             37
#define ID_COMP_VIEW_ID            38
#define ID_COMP_VIEW_NAME          39
#define ID_DELETE_CHILD            40
#define ID_DELETE_PARENT           41
#define ID_DETAIL                  42
#define ID_ENCRYPTION_KEY          43
#define ID_EXTOBJNAME              44
#define ID_FORCE_DELETE            45
#define ID_FORMAT                  46
#define ID_HOSTNAME                47
#define ID_INDEX_DIR               48
#define ID_INDEX_NAME              49
#define ID_INDEX_TO_PARENT_ITEM    50
#define ID_INETADDR_NAME           51
#define ID_ITEM_ERRFLAG            52
#define ID_ITEM_ID                 53
#define ID_ITEM_REQ_NUM            54
#define ID_ITEM_TYPE_ID            55
#define ID_ITEMTYPE_CLASS_ID       56
#define ID_LANGUAGE_CODE           57
#define ID_LEVEL                   58
#define ID_LIBRARY_ID              59
#define ID_LINKTYPE_ID             60
#define ID_LINK_ITEMID             61
#define ID_LINK_OPTION             62
#define ID_LINK_TYPE_CODE          63
#define ID_MIN_CHANGES             64
#define ID_MODEL_CCSID             65
#define ID_MODEL_FILE              66
#define ID_MODEL_NAME              67
#define ID_NUM_CHILD_TYPES         68
#define ID_NUM_OF_ATTRS            69
#define ID_NUM_OF_COMPS            70
#define ID_NUM_OF_COMPTYPE         71
#define ID_NUM_OF_COMP_ID          72
#define ID_NUM_OF_INVAL_ITEM       73
#define ID_NUM_OF_ITEM_ID          74
#define ID_NUM_OF_SECTOKEN         75
#define ID_NUM_OF_URL              76
#define ID_PARENTCOMP_ID           77
#define ID_PARENT_COMPTYPE_ID      78
#define ID_PARENT_ITEMID           79
#define ID_PARENT_ITEM_TYPE_ID     80
#define ID_PARENT_LINK_TYPE        81
#define ID_PARENT_TYPE_ID          82
#define ID_PORT                    83
#define ID_PREFETCH_COLLNAME       84
#define ID_PRIVDEF_ID              85
#define ID_PROTOCOL                86
#define ID_RESOURCE_LENGTH         87
#define ID_RM_CODE                 88
#define ID_SCHEMA_NAME             89
#define ID_SEARCH_PARM_MAXRES      90
#define ID_SEARCH_PARM_TIMEOUT     91
#define ID_SECURITY_TOKEN          92
```

-continued

```
#define ID_SEMANTIC_TYPE        93
#define ID_SEQUENCE_NUMBER      94
#define ID_SOURCE_ITEMID        95
#define ID_STRUCT               96
#define ID_TARGET_ITEMID        97
#define ID_TARGET_TABLE_NAME    98
#define ID_TEXT_SEARCH_FLAG     99
#define ID_TIEREFFLAG           100
#define ID_UDF_NAME             101
#define ID_UDF_SCHEMA           102
#define ID_UPDATE_FREQ          103
#define ID_URL_ADDRESS          104
#define ID_USER_ID              105
#define ID_VERSION_FLAG         106
#define ID_VERSION_ID           107
#define ID_WORKING_DIR          108
#define ID_LINK_TYPE            109
#define ID_SEQUENCE_NUM         110
#define ID_ATTR                 111
#define ID_COMPATTR             112
#define ID_INDEXORDER           113
#define ID_NUM_OF_ITEMTYPE      114
#define ID_USERID_LENGTH        115
#define ID_NUM_OF_LEVEL         116
#define ID_ACTIONDEF_ID         117
#define ID_PROMPT_FLAG          118
#define ID_SEQUENCE             119
#define ID_PROMPT               120
#define ID_NAME                 121
#define ID_VALUE                122
#define ID_XDO_SYSTEMTYPE       123
#define ID_XDO_COMPILEOP        124
#define ID_XDO_CPPXDOFACT       125
#define ID_ITVIEW_ID            126
#define ID_SEARCH_PARM_ORDER    127
#define ID_QUERYSTRING          128
#define ID_COMP_TYPE_ID         129
#define ID_CONSTRAINT_NAME      130
#define ID_DELETE_RULE          131
#define ID_UPDATE_RULE          132
#define ID_FOREIGN_KEY_PART     133
#define ID_FOREIGN_KEY_ACTION   134
#define ID_COLUMN_SEQ           135
#define ID_ACL_CODE             136
#define ID_PRIV_FLAG            137
#define ID_ITEM_TYPE_VIEW_ID    138
#define ID_OPERATOR             139
#define ID_COMPARE_VALUE        140
#define ID_TRANID_ID            141
#define ID_TRANSTATUS_ID        142
#define ID_RMACCESSTYPE_ID      143
#define ID_REPTYPE_ID           144
#define ID_CREATED_ID           145
#define ID_RESOURCE_FLAG        146
#define ID_REMOVEFROMAUTOFLDR_ID 147
#define ID_VERSION_CONTROL      148
#define ID_PARTNUM              149
#define ID_NUM_OF_PARTS         150
#define ID_COLL_NAME            151
#define ID_PREFETCH_COLL_NAME   152
#define ID_RESOURCE_NUM         153
#define ID_RSRCNUM_VERSION_ID   154
#define ID_TOKEN_OPTION         155
#define ID_PRIVSET_CODE         156
#define ID_TIMESTAMP            157
#define ID_RMFLAGS              158
#define ID_PRIMARY_RMCODE       159
#define ID_PRIMARY_SMSCOLL      160
#define ID_REPL_RMCODE          161
#define ID_REPL_SMSCOLL         162
#define ID_SEARCH_PARM_XQPE     163
#define ID_INPUT_OPTION         164
//*****************************************************************
    sqlint32 ICMParmParse(ICMPARMLOB_STRUCT * pParms,
              sqluint16   sElementId, // . . . Begin Repeating
              sqluint16   sDataType,
              sqluint32   lLength,
              void        *pValue,
              . . .);
```

-continued

```
sqlint32 ICMParmBuild(ICMPARMLOB_STRUCT * pParms,
                sqlint16    sElementId, // . . . Begin Repeating
                sqluint16   sDataType,
                sqlint32    lLength,
                void        *pValue,
                . . .)
```

The utility program or C interface includes a parse routine which handles NULL values. This functionality is needed to process NULLable data types. The parse routine returns an indicator for each element that indicates whether the particular value is NULL. More specifically, the indicator is set to −1 if the value is NULL. In the build routine, the length is set to −1 to indicate a NULL value.

A representative parse routine for handling NULL values is given below:

```
sqlint32 ICMParmParseNullable(ICMPARMLOB_STRUCT * pParms,
                sqlint16    sElementId,
                sqluint16   sDataType,
                sqlint32    lLength,
                sqlint16    * sIndicator,
                void        * pValue,
                . . . );
``` able length such as an array of integers, an array of character strings, or an array of mixed data types are all accommodated in the disclosed interface between a stored procedure in a server and a client system. Without the disclosed methodology, each stored procedure in the content management system server would generally require interface customization to meet its special needs in parameter passing. The disclosed technology advantageously obviates this problem. It should be understood that while one representative stored procedure has been discussed with reference to the disclosed content management system, in actual practice the server of the system can contain multiple stored procedures and multiple clients employing the disclosed methodology can be coupled to the server.

Although illustrative embodiments have been shown and described, a wide range of modification, change and substitution is contemplated in the foregoing disclosure and in some instances, some features of an embodiment may be employed without a corresponding use of other features.

| A representative build (encoding) code is given below: | |
|---|---|
| ICMPARMLOB_STRUCT parms; | // declare a ICMPARAMLOB_STRUCT structure |
| ICMPARMLOB_STRUCT *pParms = &parms; | // declare a pointer to the structure |
| long rc= 0 ; | // declare the return code variable |
| char DataValue[17]; | // declare a character array |
| char * pDataValue = &DataValue; | // declare a pointer to the array |
| // Parse the structure and get the data value | |
| rc = ICMParmParse(pParms, | // pointer to ICMPARMLOB_STRUCT structure |
| ID_CHECK_IN, | // Element ID |
| PARM_TYPE_CHAR, | // character type 17, |
| pDataValue, | // data value |
| ICM_PARMLIST_END); | // marker to indicate the end of parameter |
| A representative parsing (decoding) code is given below: | |
| ICMPARMLOB_STRUCT parms; | // declare a ICMPARAMLOB_STRUCT structure |
| ICMPARMLOB_STRUCT *pParms = &parms; | // declare a pointer to the structure |
| long rc= 0 ; | // declare the return code variable |
| char DataValue[17]; | // declare a character array |
| char * pDataValue = &DataValue; | // declare a pointer to the array |
| strcpy(pDataValue, "DATASTRING100000"); | // pass in the data |
| // Build the structure with the given data value | |
| rc = ICMParmBuild (pParms, | // pointer to ICMPARMLOB_STRUCT structure |
| ID_CHECK_IN, | // Element ID |
| PARM_TYPE_CHAR, | // character type 17, |
| pDataValue, | // data value |
| ICM_PARMLIST_END); | // marker to indicate the end |

The content management system can be stored on virtually any computer-readable storage media, such as CD, DVD and other magnetic and optical media in either compressed or non-compressed form. Of course, it can also be stored on a server computer system or other information handling system.

As can be seen, a principal advantage of the disclosed methodology and apparatus is to provide for parameter passing of structured data for stored procedures in a content management system. Desirably, structured data with vari- Accordingly, it is appropriate that the appended claims be construed broadly and in a manner consistent with the scope of the embodiments disclosed herein.

What is claimed is:

1. A method of communicating one or more pieces of data between a stored procedure in a server and a client connected to the server, the method comprising:
    calling a utility interface program in the server to encode the one or more pieces of data, the utility interface program being called by the stored procedure;

encoding the one or more pieces of data into a binary large object (BLOB)/character large object (CLOB) pair using the utility interface program, each of the one or more pieces of data corresponding to an element in the BLOB/CLOB pair; and transmitting the BLOB/CLOB pair to the client.

2. The method of claim 1, further comprising: receiving the BLOB/CLOB pair at the client; and calling the utility interface program in the server to decode the BLOB/CLOB pair, the utility interface program being called by the client.

3. The method of claim 1, wherein the one or more pieces of data are encoded into the BLOB/CLOB pair irrespective of whether the one or more pieces of data include only binary data, only character data, or a mixture of binary and character data.

4. The method of claim 1, wherein the one or more pieces of data include an array of integers.

5. The method of claim 1, wherein the one or more pieces of data include an array of character strings.

6. The method of claim 1, wherein the one or more pieces of data include an array of mixed data types.

7. The method of claim 1, wherein the one or more pieces of data are of variable length.

8. The method of claim 1, wherein each element in the BLOB/CLOB pair includes an element ID a data type, a data length, and a data value.

9. The method of claim 1, wherein the BLOB/CLOB pair is orthogonal.

10. A method of communicating one or more pieces of data between a client and a stored procedure in a server connected to the method comprising:

calling a utility interface program in the server to encode the one or more pieces of data, the utility interface program being called by the client;

encoding the one or more pieces of data into a binary large object (BLOB)/character large object (CLOB) pair using the utility interface program, each of the one or more pieces of data corresponding to an element in the BLOB/CLOB pair; and transmitting the BLOB/CLOB pair to the stored procedure.

11. The method of claim 10, further comprising:

receiving the BLOB/CLOB pair, the BLOB/CLOB pair being received by the stored procedure; and calling the utility interface program in the server to decode the BLOB/CLOB pair, the utility interface program being called by the stored procedure.

12. The method of claim 10, wherein the one or more pieces of data are encoded into the BLOB/CLOB pair irrespective of whether the one or more pieces of data include only binary data, only character data, or a mixture of binary and character data.

13. The method of claim 10, wherein the one or more pieces of data include an array of integers.

14. The method of claim 10, wherein the one or more pieces of data include an array of character strings.

15. The method of claim 10, wherein the one or more pieces of data include an array of mixed data types.

16. The method of claim 10, wherein the one or more pieces of data are of variable length.

17. The method of claim 10, wherein element in the BLOB/CLOB pair includes an element ID a data type, a data length, and a data value.

18. The method of claim 10, wherein the BLOB/CLOB pair is orthogonal.

19. A content management system comprising:

a client; and a server connected to the client, the server being responsive to the client, wherein the server includes:

a database repository, a stored procedure, which when executed, interacts with and performs database operations on the database repository, and a utility interface program, which when called by the stored procedure, encodes one or more pieces of data from the stored procedure into a binary large object (BLOB)/character large object (CLOB) pair, each of the one or more pieces of data corresponding to an element in the BLOB/CLOB pair.

20. The content management system of claim 19, wherein the one or more pieces of data are encoded into the BLOB/CLOB pair irrespective of whether the one or more pieces of data include only binary data, only character data, or a mixture of binary and character data.

21. A content management system comprising:

a client; and a server connected to the client the server being responsive to the client, wherein the server includes:

a database repository, a stored procedure, which when executed, interacts with and performs database operations on the database repository, and a utility interface program, which when called by the client, encodes one or more pieces of data from the client into a binary large object (BLOB)/character large object (CLOB) pair, each of the one or more pieces of data corresponding to an element in the BLOB/CLOB pair.

22. The content management system of claim 21, wherein the one or more pieces of data are encoded into the BLOB/CLOB pair irrespective of whether the one or more pieces of data include only binary data, only character data, or a mixture of binary and character data.

23. The content management system of claim 21, wherein, in response to receiving the BLOB/CLOB pair the stored procedure calls the utility interface program to decode the BLOB/CLOB pair.

24. A computer program product for communicating one or more pieces of data between a stored procedure in a server and a client connected to the server, the computer program product including a computer readable medium comprising a plurality of computer executable instructions for:

calling a utility interface program in the server to encode the one or more pieces of data the utility interface program being called by the stored procedure;

encoding the one or more pieces of data into a binary large object (BLOB)/character large object (CLOB) pair using the utility interface program, each of the one or more pieces of data corresponding to an element in the BLOB/CLOB pair; and transmitting the BLOB/CLOB pair to the client.

25. The computer program product of claim 24, wherein the computer readable medium is an optical disk.

26. The computer program product of claim 24, wherein the computer readable medium is a magnetic disk.

* * * * *

UNITED STATES PATENT AND TRADEMARK OFFICE
CERTIFICATE OF CORRECTION

| | | |
|---|---|---|
| PATENT NO. | : 7,082,455 B2 | Page 1 of 1 |
| APPLICATION NO. | : 10/128260 | |
| DATED | : July 25, 2006 | |
| INVENTOR(S) | : Hu et al. | |

It is certified that error appears in the above-identified patent and that said Letters Patent is hereby corrected as shown below:

In column 5, line 19, delete "output area and a second output area;" and replace with -- in one of the first and second output areas, wherein the listing step (b) further includes the steps of:--.

Column 13

Line 31, add --the client,-- after "to" and before "the".

Line 61, add --each-- after "wherein" and before "element".

Signed and Sealed this

Thirty-first Day of October, 2006

JON W. DUDAS
*Director of the United States Patent and Trademark Office*